US012789283B2

(12) United States Patent
Dappers et al.

(10) Patent No.: US 12,789,283 B2
(45) Date of Patent: Nov. 10, 2026

(54) WELDING DEVICE WITH SONOTRODE AS WELL AS ASSOCIATED WELDING METHOD

(71) Applicant: BRANSON Ultraschall Niederlassung der Emerson Technologies Gmbh & Co. OHG, Dietzenbach (DE)

(72) Inventors: Oliver Dappers, Erzhausen (DE); Babak Saberi, Dietzenbach (DE)

(73) Assignee: BRANSON ULTRASCHALL NIEDERLASSUNG DER EMERSON TECHNOLOGIES GMBH & CO. OHG, Dietzenbach (DE)

( * ) Notice: Subject to any disclaimer, the term of this patent is extended or adjusted under 35 U.S.C. 154(b) by 5 days.

(21) Appl. No.: 18/785,029

(22) Filed: Jul. 26, 2024

(65) Prior Publication Data

US 2025/0033139 A1 Jan. 30, 2025

(30) Foreign Application Priority Data

Jul. 27, 2023 (DE) ......................... 102023120065.8

(51) Int. Cl.
*B23K 20/10* (2006.01)
*B29C 65/08* (2006.01)

(52) U.S. Cl.
CPC ............ *B23K 20/106* (2013.01); *B29C 65/08* (2013.01)

(58) Field of Classification Search
None
See application file for complete search history.

(56) References Cited

U.S. PATENT DOCUMENTS 4,299,349 A * 11/1981 Gilden .................. B29C 66/135 229/5.85
6,599,381 B2 7/2003 Urlaub et al.
(Continued)

FOREIGN PATENT DOCUMENTS

DE 2826116 A1 1/1979
DE 3240810 A1 5/1984
(Continued)

OTHER PUBLICATIONS

Search Report issued Mar. 20, 2024 in corresponding German Patent Application No. 10 2023 120 065.8, 4 pages. (See accompanying statement of relevance filed herewith).
(Continued)

*Primary Examiner* — Barbara J Musser
(74) *Attorney, Agent, or Firm* — MH2 Technology Law Group, LLP

(57) ABSTRACT

A sonotrode for friction welding of at least two joining parts, which are at least partly made of weldable material, in particular plastic material. The sonotrode comprises a basic body with a first axial end and an opposite second axial end, with the basic body having a central longitudinal axis extending through the first and the second axial end and along which the sonotrode is movable in operation. Furthermore, adjacent to the second axial end, a work surface is provided at the basic body laterally with respect to the central longitudinal axis, which in operation is contactable to one of the joining parts, so that joining energy is laterally introducible into a joining zone between the joining parts. The work surface encompasses the basic body circumferentially, preferably without interruption, and comprises a structure that is adapted to a shape of at least one of the joining parts.

12 Claims, 5 Drawing Sheets

(56) References Cited

U.S. PATENT DOCUMENTS

Figure 1:
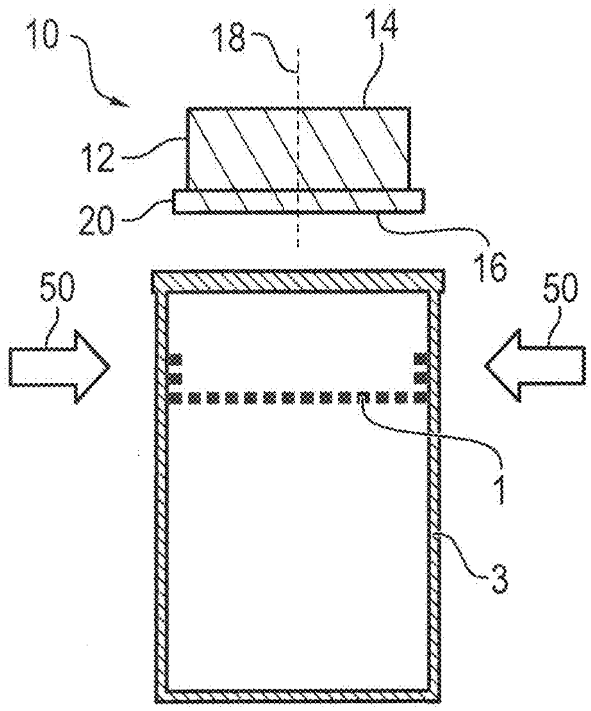

| | | | |
|---|---|---|---|
| 2003/0062110 A1 | 4/2003 | Urlaub et al. |
| 2004/0112547 A1 | 6/2004 | Tamamoto |
| 2008/0290100 A1 | 11/2008 | Michalsky et al. |
| 2017/0120504 A1 | 5/2017 | Stefanziosa |

FOREIGN PATENT DOCUMENTS

| | | | |
|---|---|---|---|
| DE | 3240810 C2 | 1/1986 |
| DE | 20105550 U1 | 8/2001 |
| DE | 102022202763 A1 | 9/2023 |
| EP | 0167645 A1 | 1/1986 |
| EP | 3023224 B1 | 3/2019 |
| EP | 2894022 B1 | 1/2020 |
| EP | 3936273 A1 | 1/2022 |
| JP | S59227419 A | 12/1984 |
| JP | H10203511 A | 8/1998 |
| WO | 2023180028 A1 | 9/2023 |

OTHER PUBLICATIONS

Partial Search Report issued Dec. 6, 2024 in corresponding European Patent Application No. 24188693.6, 14 pages.

Office Action with English translation issued May 8, 2025 in corresponding Japanese Patent Application No. 2024-114498, 15 pages.

Smits, Anne-Marie (Formalities Officer), Communication pursuant to Rule 114(2) EPC issued Oct. 2, 2025 in corresponding European Patent Application No. 24188693.6 for Third Party Observations submitted Sep. 23 & 26, 2025, 16 pages.

* cited by examiner

WELDING DEVICE WITH SONOTRODE AS WELL AS ASSOCIATED WELDING METHOD

CROSS REFERENCE TO RELATED APPLICATION

This patent application claims the benefit and priority of German Patent Application No. 10 2023 120 065.8, filed with the German Patent Office on Jul. 27, 2023, which is hereby incorporated by reference herein in its entirety as part of the present application.

1. FIELD OF THE INVENTION

The present invention is related to a sonotrode for friction welding of at least two joining parts which consist at least partly of weldable material, in particular plastic material, a corresponding welding device, a positioning method for positioning a first joining part as well as a corresponding welding method and an associated container.

2. BACKGROUND OF THE INVENTION

In the production of containers, such as for example yoghurt cups, one-way drinking cups or other containers with a bottom and/or intermediate bottom, first of all, a main body of the container is provided, e.g. in the form of a hollow cylinder. For closing this main body on one side, a bottom is fixed to same, normally by means of an adhesive. Alternatively to that, the connection between main body and bottom can take place by a thermal heating of the joining partners, e.g. by means of hot air or hot punching, as well as a by a mechanical connecting, e.g. by pressure elements or rollers, respectively.

Here, a disadvantage is the low cycle time as well as the effort due to the use of an adhesive for connecting the main body with the bottom. Furthermore, in the production of such containers for the food sector as well as the pharmaceutical sector, specific requirements must be observed particularly with regard to the used adhesive, which leads to the production becoming cost-intensive. Furthermore, the accessibility to the main body is not always guaranteed to a sufficient degree.

It is therefore the objective technical object of the invention to provide an alternative production method for containers with a bottom, which are particularly used in the sector of packaging, food and pharmacy. Here, the production method should mainly provide a reliable connection between the main body of the container and the bottom and should be optimized economically.

3. SUMMARY OF THE INVENTION

The above object is solved by a welding device according to claim 1, and a welding method according to claim 5. Advantageous embodiments and further developments arise from the subsequent description, the drawings as well as the appending claims.

An inventive sonotrode for friction welding of at least two joining parts, which are at least partly made of weldable material, in particular plastic material, comprises a basic body with a first axial end and an opposite second axial end, with the basic body having a central longitudinal axis extending through the first and the second axial end and along which the sonotrode is movable in operation or along which an excursion of the sonotrode can take place in operation, and adjacent to the second axial end, a work surface is provided at the basic body laterally with respect to the central longitudinal axis, which in operation is attachable to one of the at least two joining parts, so that joining energy can be introduced laterally into a joining zone between the at least two joining parts, with the work surface encompassing the basic body, preferably without any interruption, and comprising a first structure, the form of which is adaptable or adapted to the shape of at least one of the two joining parts.

The above inventive sonotrode is now explained in more detail based on a functionality of a welding device during a corresponding friction welding method, with exemplary reference being made to the production of a yoghurt cup or a one-way drinking cup as the container.

The cup as a container comprises, as joining parts, a bottom as the first joining part and a hollow main body as the second joining part. For example, the main body has the shape of a cylinder or a cone. The main body is supposed to be closed on one side with the bottom. That means that the bottom is fastened adjacent to an axial end of the main body. Such as bottom is also called closing bottom. Alternatively, the fastening of the bottom at another position in the main body is preferred. In this case, the bottom is an intermediate bottom. Thus, the term bottom generally comprises closing bottoms or intermediate bottoms in the present description.

Due to the used welding method, the material of the main body must be weldable with the material of the body. Therefore, the main body and/or the bottom must comprise a weldable material at least in the joining portion, or must consist of same. An example for such a weldable material is for example a correspondingly coated or laminated paper and the like. For example, the paper comprises a plastic coating, in particular out of polyethylene (PE) or polypropylene (PP). The main body and the bottom, i.e. the second joining part and the first joining part can consist of the same or of different material. Same materials are particularly preferred as then, a particularly reliable welding connection can be achieved.

With respect to the cup as an example for a container, the material of the hollow main body is radially bent to the inside at one end in a first partial portion and in the direction of the other end of the main body in a subsequent second partial portion. That way, a circumferential U-form is formed at one end inside of the main body. At the radial outside, the bottom has a partial portion that extends preferably parallel or almost parallel to a surface normal of the bottom and is later at least partially arranged in the U-form that is formed by the main body.

The welding device comprises the inventive sonotrode as well as a holding device having an anvil with a basic body as well as at least one pressure segment. With respect to the cup as an example, the basic body of the anvil has a form which is formed preferably complementary with regard to the main body of the cup. This is, however, not absolutely necessary for all containers, as is described later based on an alternative example, too.

First of all, the welding method comprises the step of providing the first and the second joining part, which are at least partly made of a weldable plastic material. With respect to the cup as an example, it is preferred that the first joining part, i.e. the bottom, is arranged on the basic body of the anvil. In doing so, the partial portion of the bottom which extends parallel to the surface normal faces away from the basic body. Now, the second joining part, i.e. the hollow main body, is arranged on the basic body of the anvil in a way that the U-shape of the main body receives the partial portion of the bottom which extends parallel to the surface normal. That way, the first and the second joining part overlap in this portion so that the overlapping portion is also referred to as joining zone or joining portion.

The sonotrode and the anvil are now moved relatively to one another, preferably along only one axis, so that the lateral or radially outer work surface of the sonotrode is arranged adjacent to the joining portion. In order to achieve a safe positioning of the joining parts, the at least one pressure segment, preferably at least two pressure segments, which in case of a cylindrical main body are for example formed as a semi-circle, are moved in the direction of the joining parts that are to be connected with one another, until same pushes the joining parts against the work surface of the sonotrode. Preferably, there are so many pressure segments that the two joining parts can be welded with each other in one step in the joining portion.

Next, the sonotrode is induced to vibrate, so that joining energy is laterally or radially introduced into the joining zone and the welding connection between the first and the second joining part is formed.

Particularly the amplitude of the sonotrode, the pressure applied on the joining parts to be welded as well as the joining time are varied as parameters for setting the welding method. In a preferred embodiment, the vibration frequency of the sonotrode is therefore not varied.

After the welding process has been concluded, the work surface of the sonotrode and the at least one pressure segment are moved apart, so that the first and second joining parts which are welded together can be removed from the welding device. For this purpose, the sonotrode is also moved relative to the anvil at the same time or after the pressure segments have been moved away.

An advantage of the present invention is that with this design, friction welding connections can be manufactured in case of containers with closed contours, so that the use of a separate glue becomes superfluous. This facilitates the production of the containers and provides for quick working cycles due to the quick, efficient and cost-effective welding method. Likewise, the maintenance effort as well as the necessary room for the welding device in comparison with other manufacturing methods is low, as is the effort for controlling the method.

In an advantageous configuration of the sonotrode, the work surface has a second structure, in particular in the form of a plurality of elevations. By means of the second structure, a joining part which in operation is pressed against the sonotrode is dragged along by the sonotrode and is set into vibration. Therefore, the second structure of the sonotrode can also be referred to as dragging structure. Preferably, the dragging structure digs into the adjacent joining part so that the adjacent joining part essentially carries out the same movements as the sonotrode. That way, a connection between two components by means of friction welding can effectively be realized.

Furthermore, it is preferred that in cross-section with regard to the longitudinal axis, the first structure has one of the following forms: circle, ellipse, oval, polygon, preferably with rounded corners, or a combination of them. That way, the first structure and thus the work surface of the sonotrode can be adapted or are adapted optimally to the joining parts to be connected with one another, e.g. to a hollow main body which is configured cylindrically, cone-like, rectangularly with rounded corners or the like.

In a particularly preferred embodiment of the sonotrode, the basic body comprises at least one channel, with an end of the channel being arranged at the second axial end of the basic body of the sonotrode, and the other end of the channel is connectable with a negative pressure source, so that with the sonotrode, the first joining part is retainable and/or positionable.

An advantage of this design is that the first joining part, namely with respect to the above example the bottom of the cup, can be retained by the sonotrode. Thus, the sonotrode can position the bottom at a required position in the hollow main body of the container and fasten it there in combination with the at least one pressure segment by means of friction welding. That way, the main body of the container can be provided with an intermediate bottom, e.g. after a partial volume of the container has been filled with a product already. In this case, the basic body of the anvil is for example made of one plane surface on which the main body is arranged or deposited, as it does not have to assume any stabilizing function for the main body.

A corresponding positioning method with the sonotrode that has been configured that way therefore includes in a first step a providing of the first joining part. After that, the first joining part is arranged adjacent to the second axial end of the sonotrode and is retained there due to the negative pressure. Now, the sonotrode with the retained first joining part is positioned at a required position, e.g. in the container that is already filled with a product.

An inventive welding device for friction welding of at least two joining parts, which at least partly consist of weldable material, e.g. plastic material, comprises an inventive sonotrode as well as a holding device having an anvil with a basic body and at least one pressure segment, preferably at least two pressure segments, wherein in operation of the welding device, the at least two joining parts can be pressed against the work surface of the sonotrode by means of the at least one pressure segment. With respect to the operation method and the advantages resulting from same, reference is made to the above remarks in respect of the inventive sonotrode.

In a preferred embodiment of the welding device, the basic body of the anvil has a form which is adaptable or adapted to a shape of at least one of the two joining parts. With this design, the basic body of the anvil assumes a stabilizing and positioning function, for example for the main body of the container to be produced.

Preferably, the at least one pressure segment has a form which is at least partly adaptable or adapted to a shape of at least one of the two joining parts. It is the object of the pressure segments to safeguard the welding connection in the joining portion, as is explained above. To carry same out in as few steps as possible, preferably in only one step, several pressure segments which can press the complete joining portion against the work surface of the sonotrode are present. For this reason, it is preferred that the pressure segment(s) is/are adaptable or adapted to the shape of the second joining part.

It is furthermore preferred that the at least one pressure segment comprises a structure, preferably in the portion of a pressure surface, in particular in the form of a plurality of elevations. Due to the plurality of elevations, a respective joining part can be held or clamped particularly safe between the pressure surface of the pressure segment and the work surface of the sonotrode. In particular, the pressure surface of the pressure segment digs into the respective joining part adjacent to the pressure surface by means of this second structure. That way, an effective tight retention of the corresponding joining part can be realized. The structure of the pressure surface of the pressure segment can therefore also be called retaining structure. This embodiment is particularly preferred in combination with the sonotrode which has a second structure for dragging a joining part abutting same.

An inventive positioning method for positioning a first joining part, which is at least partly composed of weldable material, in particular plastic, by means of a sonotrode having a basic body with a first axial end, an opposite second axial end and a lateral work surface which is present circumferentially around the basic body and at least one channel, with one end of the channel being arranged at the second axial end of the basic body of the sonotrode and the other end of the channel being connected with a negative pressure source, in particular by means of an inventive sonotrode in the embodiment with the at least one channel, comprising the following steps: providing the first joining part, arranging the first joining part adjacent to the second axial end of the sonotrode, retaining the first joining part that is arranged adjacent to the second axial end of the sonotrode by means of negative pressure and positioning the sonotrode with the first joining part retained there at a required position. In a preferred embodiment, the positioning method comprises the further step: releasing the first joining part at the required position. With regard to the advantages arising from that, reference is made to the above remarks regarding the sonotrode with channel to avoid repetitions.

An inventive welding method, in particular with an inventive welding device, comprises the steps: providing a first and a second joining part which are at least partly made of a weldable material, arranging the first and the second joining part between the work surface of the sonotrode, which is arranged laterally to the vibration direction of the sonotrode, and the at least one pressure segment, in particular in a way that the first as well as the second joining part are pressed against the work surface of the sonotrode by means of the at least one pressure segment, inducing the sonotrode to vibrate causing joining energy to be laterally introducible into a joining zone and a welding connection to establish between the first joining part and the second joining part, and moving apart the work surface of the sonotrode and the at least one pressure segment so that the first and second joining parts which are welded together can be taken out from the welding device. Within the course of the welding method, it is of advantage that the inducing of the sonotrode to vibrate takes place such that the work surface is aligned parallel with respect to the vibration direction of the sonotrode. With regard to the functionality of the inventive welding method, reference is made to the above remarks in respect of the inventive sonotrode. The arising advantages correspond to the advantages discussed in connection with the inventive sonotrode.

In a preferred embodiment of the welding method, a vibration of the sonotrode takes place in the ultra-sonic range, preferably between 15 and 40 kHz, particularly preferred between 20 and 40 kHz. Due to the indicated frequence ranges, the sonotrode operates in the ultrasonic range and a quick, efficient and economic connecting of two joining parts with each other is guaranteed.

It is furthermore preferred that the welding method furthermore comprises the steps of the inventive positioning method, with the steps of the inventive positioning method being realized in the course of the steps of the providing and the arranging. The step of the releasing according to the preferred embodiment of the positioning method is preferably carried out during or after the step of welding. With respect to the arising advantages, reference is made to the remarks regarding the sonotrode with channel as well as to the inventive positioning method.

An inventive container consists of a bottom as the first joining part and a hollow main body as the second joining part, with the first and the second joining part consisting at least partly of a weldable material and being welded together in a joining portion, preferably completely, in particular by means of the inventive welding method. In a preferred embodiment of the container, the cross section of the joining part has one of the following forms: circle, ellipse, oval, polygon, preferably with rounded corners, or a combination of these forms. Here as well, reference is made to the above explanations in respect of the advantages in order to avoid repetitions.

4. SHORT SUMMARY OF THE DRAWINGS

Figure 2:
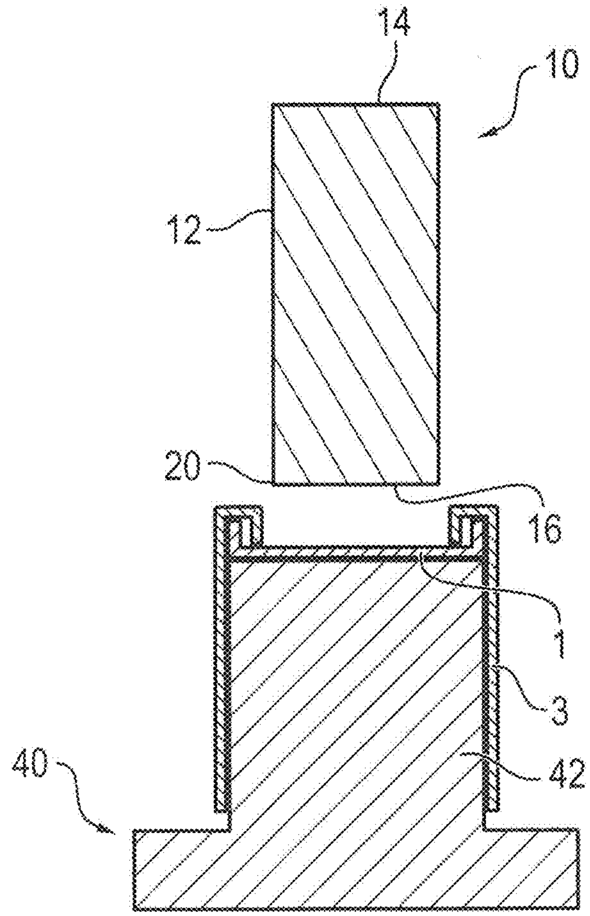
Figure 3:
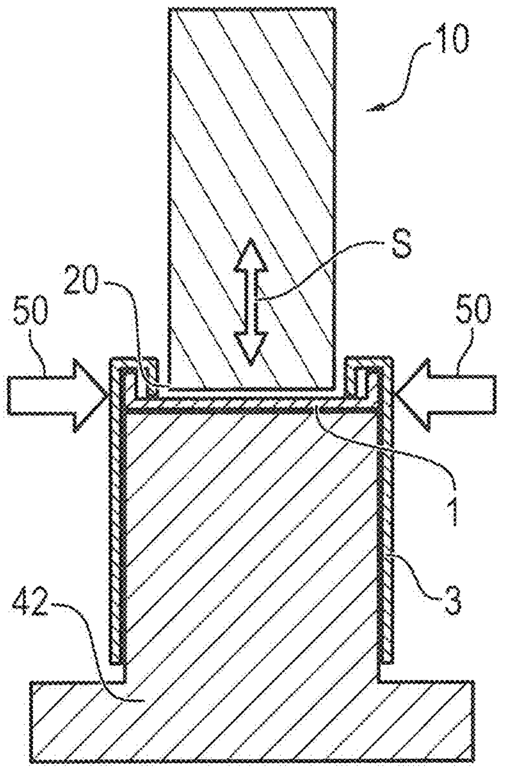
Figure 4:
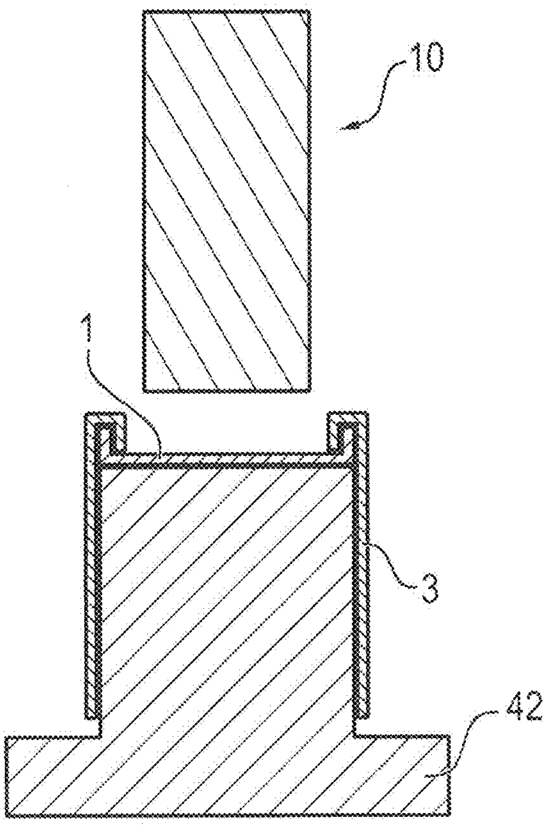
Figure 5:
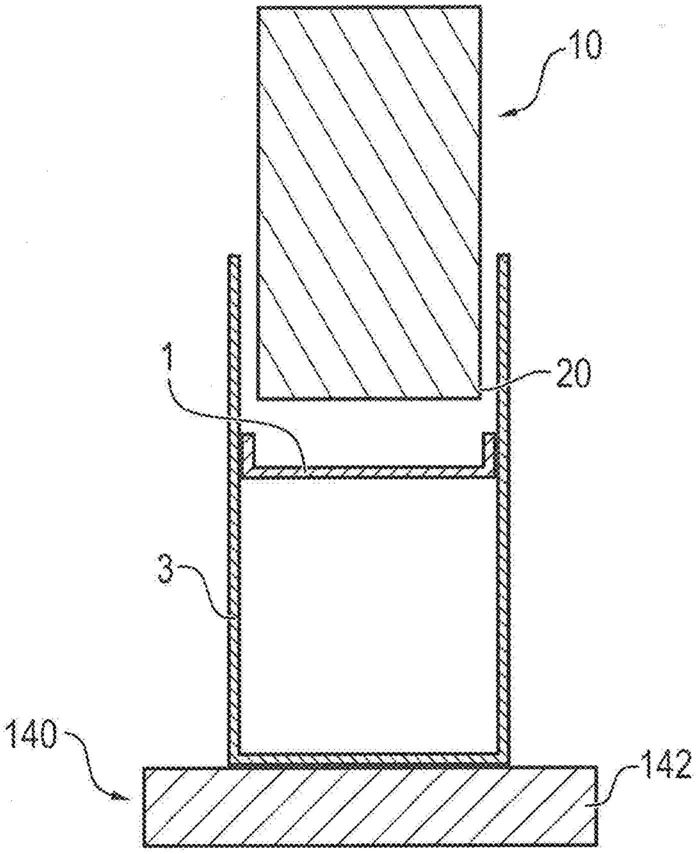
Figure 6:
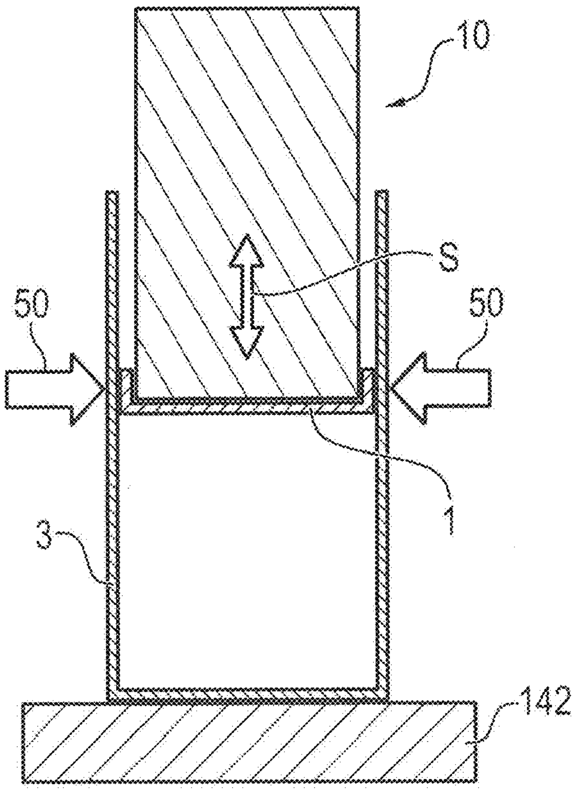
Figure 7:
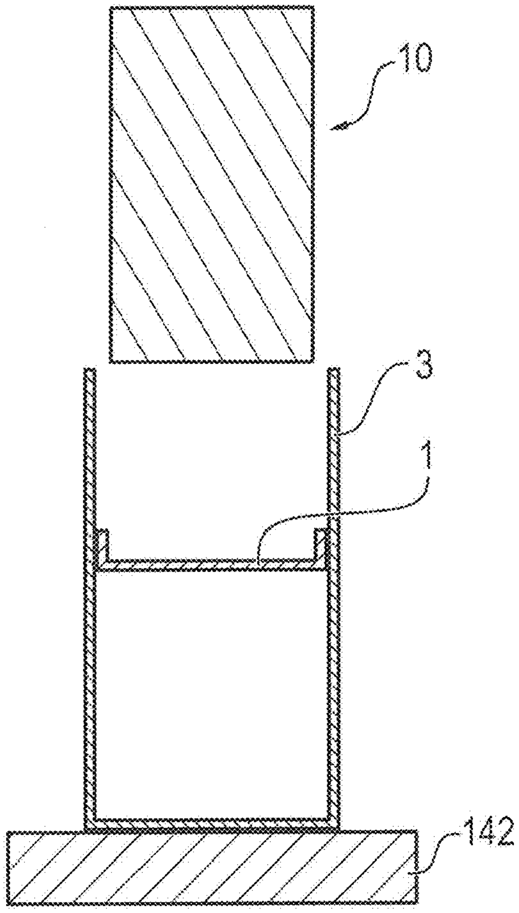
Figure 8:
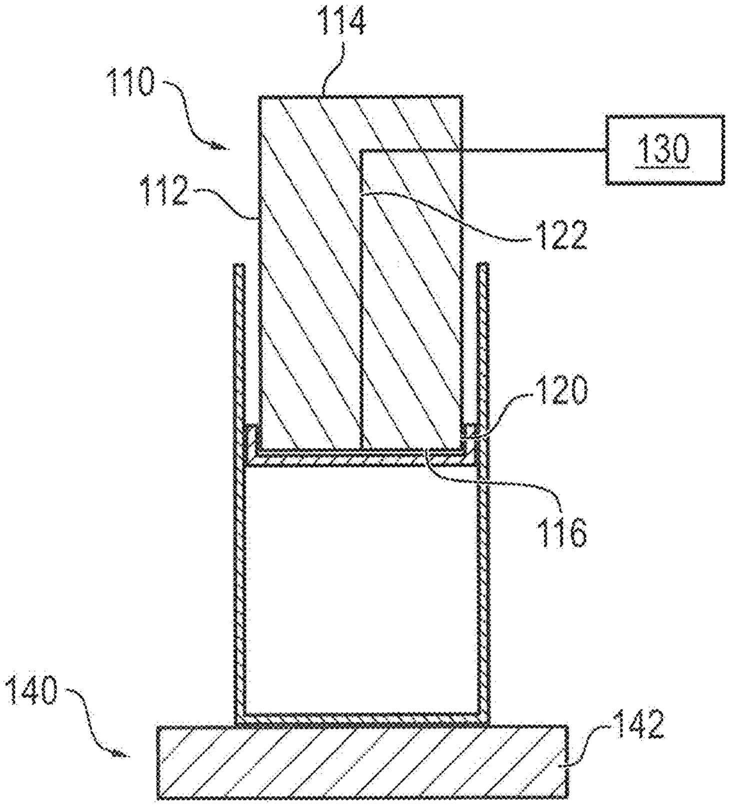
Figure 9:
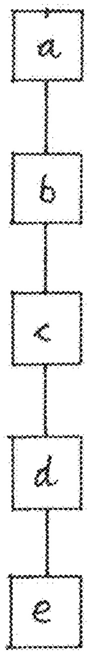
Figure 10:
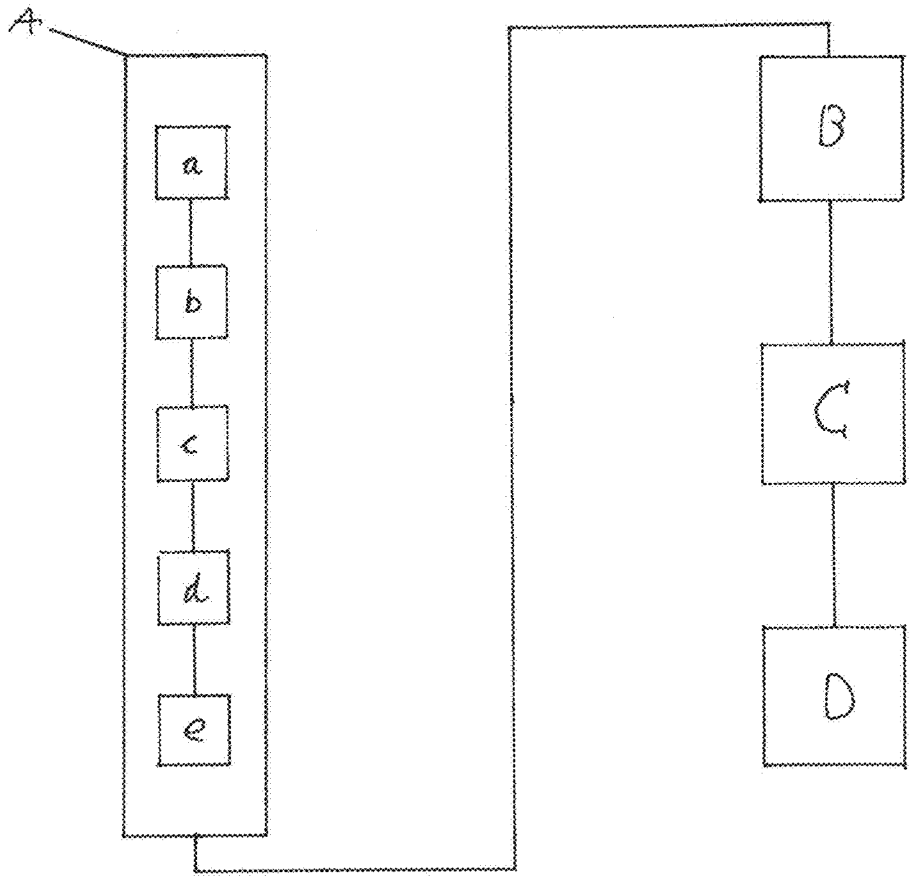

In the following, the present invention is described in detail with reference to the drawings. In the drawings, the same reference signs refer to the same components and/or elements. They show:

FIG. 1 a schematic view of a first embodiment of an inventive sonotrode,

FIGS. 2 to 4 schematic views of a first embodiment of an inventive welding device in different stages of a manufacturing process of a first container, FIGS. 5 to 7 schematic views of a second embodiment of an inventive welding device at different stages of manufacturing a second container, FIG. 8 a schematic view of a third embodiment of an inventive welding device, FIG. 9 a flow chart of an embodiment of an inventive positioning method and FIG. 10 a flow chart of an embodiment of an inventive welding method.

5. DETAILED DESCRIPTION OF THE PREFERRED EMBODIMENTS

The embodiments of the inventive welding device as well as of the inventive sonotrode are described by means of the manufacturing of a container such as a yoghurt cup or a one-way drinking cup and a container with intermediate bottom.

The cup as container comprises as components a bottom as a first joining part 1 and a hollow main body, e.g. in the form of a cylinder or cone, as the second joining part 3. The main body is intended to be closed on one side with the bottom. The bottom is therefore fastened adjacent to an axial end of the main body. In this regard, reference is made to the illustrations in FIGS. 2 to 4. Alternatively, the fastening of the bottom at another position in the main body is preferred, as is shown in FIGS. 1 and 5 to 8. In this case, the bottom is an intermediate bottom.

Due to the used welding method, the material of the main body must be welded together with the material of the bottom. Therefore, the main body and/or the bottom must comprise a weldable material at least in the joining portion or must be made of same. An example for such a weldable material is a correspondingly coated or laminated paper and the like. For example, the paper has a plastic coating, in particular out of polyethylene (PE) or polypropylene (PP). The main body and the bottom, i.e. the second joining part 3 and the first joining part 1, can consist of the same or of a different material. The same materials are particularly preferred as then, a particularly reliable welding connection is achievable.

Now particularly with reference to FIG. 1, a first embodiment of a sonotrode 10 for friction welding the first 1 and the second joining part 3 is explained. The sonotrode 10 comprises a basic body 12 with a first axial end 14 and an opposite second axial end 16. Furthermore, the basic body comprises a central longitudinal axis 18. It extends through the first 14 and the second axial end 16. In operation, the sonotrode 10 is movable or can carry out an excursion along the central longitudinal axis 18, as can be seen in FIGS. 3 and 6 by means of the S-labelled arrow labelled for the vibration direction.

Adjacent to the second axial end 16, a work surface 20 is provided at the basic body 12 laterally with respect to the central longitudinal axis 18. This work surface 20 can be adjoined to one of the two joining parts 1, 3 in operation, so that joining energy can be introduced laterally into a joining zone or a joining portion between the first 1 and the second joining part 3. In doing so, the work surface 20 encompasses the basic body 12 circumferentially preferably without any interruption and comprises a first structure, the form of which is adaptable or adapted to the shape of at least the second joining part 3. Exemplary forms for the first structure are diamond-shapes, wave lines, lines and the like.

For example, the first structure has one of the following shapes in cross section with respect to the longitudinal axis 18: circle, ellipse, oval, polygon, preferably with rounded corners, or a combination of same. That way, the first structure and thus the work surface 20 of the sonotrode 10 are optimally adaptable or adapted to the joining parts 1, 3 to be connected, e.g. to a hollow main body that is configured cylindrically, cone-like, rectangular with rounded corners or the like.

Furthermore, the work surface 20 of the sonotrode 10 has a second structure, in particular in the form of a plurality of elevations. A joining part 1, 3 which is pressed against the sonotrode in operation by means of the second structure, is dragged along by the sonotrode 10 and set into vibration. The second structure of the sonotrode 10 can therefore also be called dragging structure. Preferably, the dragging structure digs into the adjoining joining part 1, 3 so that the adjoining joining part 1, 3 essentially carries out the same movements as the sonotrode 10. That way, a connection between two components or joining parts 1, 3 by means of friction welding can effectively be implemented.

The above inventive sonotrode is now described in more detail with reference to FIGS. 2 to 4 based on a functionality of a welding device during a corresponding friction welding method, with exemplary reference being made to the production of a yoghurt cup or a one-way drinking cup as the container.

With reference to the cup as an example for a container, the hollow main body is bent radially to the inside on one end in a first partial portion and bent in the direction of the other end of the main body in a subsequent second partial portion. That way, a circumferential U-shape is formed at one end inside of the main body as the second joining part 3. The bottom as the first joining part 1 has a partial portion radially outside, which preferably extends parallel or almost parallel to a surface normal of the bottom and is arranged at least partially in the U-shape that is formed by the main body.

The welding device comprises the sonotrode 10 as well as a holding device having an anvil 40 with a basic body 42 as well as at least one pressure segment 50. With respect to the FIGS. 2 to 4, the basic body 42 of the anvil 40 has a form which is formed complementary with regard to the main body of the cup as the second joining part 3. With this configuration, the basic body 42 of the anvil 40 assumes a stabilizing and positioning function for the main body of the container to be produced. This is, however, no absolute requirement for all containers, as will also be explained later with respect to the embodiments shown in FIGS. 5 to 7.

In the illustrated embodiment, the pressure segments 50, preferably at least two pressure segments 50, are schematically illustrated by means of arrows. The pressure segments 50 have a form which is at least partly adaptable or adapted to a shape of the second joining part 3. It is the task of the pressure segments 50 to guarantee the welding connection in the joining region. Several pressure segments 50 are present so that this can take place in as few steps as possible, preferably in only one step, with the pressure segments being capable of pressing the complete joining region against the work surface 20 of the sonotrode 10. For this reason, it is preferred that the pressure segment(s) 50 is/are adaptable or adapted to the shape of the second joining part 3.

Advantageously, the pressure segments 50 have a structure, preferably in the region of a pressure surface, that is present particularly in the form of a plurality of elevations. Due to the plurality of elevations, a respective joining part 1, 3 can be held or clamped, respectively, particularly safe between the pressure surface of the pressure segment 50 and the work surface 20 of the sonotrode 10. In particular, the pressure surface of the pressure segment 50 digs into the respective abutting joining part 1, 3 by means of this structure. That way, an effective holding of the corresponding joining part 1, 3 can be realized. The structure of the pressure surface of the pressure segment 50 can therefore also be referred to as retaining or holding structure. This embodiment is particularly preferred in combination with the sonotrode 10 which comprises the second structure for dragging a joining part 1, 3 adjoining same.

The welding method firstly comprises the step of the providing of the first 1 and the second joining part 3, which consist at least partly of a weldable plastic material. Firstly, the first joining part 1, i.e. the bottom, is arranged on the basic body 42 of the anvil 40. Here, the partial portion of the bottom, which extends parallel to the surface normal, faces away from the basic body 42. The second joining part 3, i.e. the hollow main body, is arranged on the basic body 42 of the anvil 40 in a way that the U-form of the main body receives the partial portion of the bottom which extends parallel to the surface normal. Thus, the first 1 and the second joining part 3 overlap in this region or portion, so that the overlapping region is also called joining zone or joining portion or region. This is shown in FIG. 2.

Now, the sonotrode 10 and the anvil 40 are moved relatively to one another, preferably along only one axis, so that the lateral or radial external work surface 20 of the sonotrode 10 is arranged next to the joining portion. In order to achieve a secure positioning of the joining parts, the at least two pressure segments, which are schematically shown by the arrows 50 and which in case of a cylindrical main body are formed for example semi-circular, are moved in the direction of the joining parts 1, 3 that are to be connected with each other, until same pushes the joining parts 1, 3 against the work surface 20 of the sonotrode 10. Preferably, there are as many pressure segments 50 as necessary so that the two joining parts 1, 3 can be welded together in the joining portion in one step. The resulting arrangement can be seen in FIG. 3.

The sonotrode 10 is now induced to vibrate leading to joining energy being introduced laterally or radially into the joining zone or the joining portion and the welding connection between the first 1 and the second joining part 3 being formed.

In particular, the amplitude of the sonotrode 10, the pressure applied on the joining parts 1, 3 to be welded, as well as the joining time as parameters for setting the welding method are varied. In a preferred embodiment, no variation of the vibration frequency of the sonotrode 10 takes place.

Once the welding process is completed, the work surface 20 of the sonotrode 10 and the at least one pressure segment 50 are moved apart so that the first 1 and the second joining part 3 which are welded together can be removed from the welding device. For this purpose, the sonotrode 10 is also moved relatively to the anvil 40 at the same time or after the pressure segments 50 have been moved away. Reference is made to FIG. 4 in this regard.

The container which has been produced that way is comprised of the bottom as the first joining part 1 and the hollow main body as the second joining part 3. The first 1 and the second joining part 3 are at least partly made of a weldable material and are welded together in a joining portion, preferably completely. In cross section, the joining portion preferably has one of the following forms: circle, ellipse, oval, polygon, preferably with rounded corners, or a combination of same.

Therefore, an advantage of this welding device is that the friction welding connections can be established in case of containers with closed contours, so that the use of a separate glue becomes superfluous. This facilitates the production of the containers and provides for quick working cycles due to the quick, efficient and low-cost welding process. Likewise, the maintenance effort as well as the necessary space for the welding device in comparison to other production methods is low, just as the effort for controlling the process. Furthermore, the danger of a possible damaging of the product to be filled in is reduced, as can for example be the case with a thermal melting of the joining partners by means of hot air or hot punching.

With reference to FIGS. 5 to 7, a second embodiment of a welding device is now explained. It serves for producing a container with a hollow main body as the second joining part 3 and an intermediate bottom as the first joining part 1. This welding device differs from the first embodiment in particular due to the used anvil 140, as it is only made of a plane surface as the basic body, on which the main body is arranged or placed. A form of the basic body 142 which is formed complementary to the main body is not necessary, as it does not have to assume any stabilizing function for the main body. It is, however, of advantage when the basic body 142 has a positioning possibility for the main body in order to allow a safe positioning.

FIG. 8 shows a further embodiment of a sonotrode 110 comprising a basic body 112 with a first axial end 114 and an opposite second axial end 116. Here, the basic body 112 has at least one channel 122. An end of the channel 122 is arranged at the second axial end 116 of the basic body 112 of the sonotrode 110. The other end of the channel 122 is connectable with a negative pressure source 130. That means that the first joining part 1 is firmly holdable and/or positionable with the sonotrode 110. An advantage of this configuration is that the first joining part 1, i.e. with reference to the above example the bottom of the cup, can be held tight by the sonotrode 110. Thus, the sonotrode 110 can place the bottom at a desired position in the hollow main body of the container and fasten it there in combination with the at least one pressure segment 50 by means of friction welding. That way, the main body of the container can be provided with an intermediate bottom, e.g. after a partial volume of the container has already been filled with a product. In this regard, exemplary reference is made to the production of a container, as is shown in FIGS. 5 to 7.

A corresponding positioning method with the sonotrode 100 configured that way is explained with reference to FIG. 9. First of all, the providing of the first joining part 1 takes place in a first step a. After that, the first joining part 1 is arranged adjacent to the second axial end 116 of the sonotrode 110 (step b) and retained there due to the negative pressure (step c). Now, the sonotrode 110 with the first joining part 1 that is retained there is positioned in step d at a required position, e.g. as intermediate bottom in the container that is already filled with a product. After that, a releasing of the first joining part 1 at the required position takes place in step e. With respect to the subsequently explained welding method, this can take place during or after the welding of the intermediate bottom as the first joining part 1 with the main body as the second joining part 3.

Finally with reference to FIG. 10, an embodiment of a welding method is explained. In a first step A, a providing of the first 1 and the second joining part 3 takes place, which are at least partly made of weldable material. This step can comprise the above-explained positioning method, in particular when the sonotrode 110 which is equipped with a channel 122 is used.

After that, the first joining part 1 and the second joining part 3 are arranged between the work surface 20; 120 of the sonotrode 10; 110 that is arranged laterally to the vibration direction of the sonotrode 10; 110 and the at least one pressure segment 50. This takes place particularly in a way that the first 1 as well as the second joining part 3 are pushed against the work surface 20; 120 of the sonotrode 10; 110 by means of the at least one pressure segment 50. In this position, an inducing of the sonotrode 10; 110 to vibrate takes place in step C, so that joining energy can be introduced laterally into the joining zone and a welding connection between the first joining part 1 and the second joining part 3 is formed. Finally, the work surface 20; 120 of the sonotrode 10; 110 and of the at least one pressure segment 50 are moved apart one another in step D so that the first 1 and the second joining part 3 which are welded together can be removed from the welding device. In the course of the welding method, it is of advantage that the inducing of the sonotrode 10; 110 to vibrate is carried out such that the work surface 20; 120 is aligned parallel to the vibration direction of the sonotrode. Furthermore, it is of advantage that a vibration of the sonotrode 10; 110 takes place in the ultrasonic range, preferably between 15 and 40 kHz, in particular preferred between 20 and 40 kHz. Particularly due to the indicated frequency ranges, the sonotrode 10; 110 operates in the ultrasonic range and a quick, efficient and economic connecting of the two joining parts 1, 3 with one another is guaranteed.

6. LIST OF REFERENCE SIGNS

1 first joining part
3 second joining part
10 sonotrode
12 basic body
14 first axial end
16 second axial end
18 central longitudinal axis
20 work surface
40 anvil
42 basic body
50 pressure segment

110 sonotrode
112 basic body
114 first axial end
116 second axial end
120 work surface
122 channel
130 negative pressure source
140 anvil
142 basic body
S vibration direction of the sonotrode 10; 110

The invention claimed is:

1. A welding device for friction welding of at least two joining parts, which at least partly consist of weldable material, the welding device comprising:

a sonotrode comprising:

a) a basic body with a first axial end and an opposite second axial end, with the basic body having a central longitudinal axis extending through the first and the second axial end and along which the sonotrode is movable in operation, and b) adjacent to the second axial end, a work surface is provided on the basic body laterally with respect to the central longitudinal axis, and which in operation is contactable to one of the at least two joining parts, so that joining energy is laterally introducible into a joining zone between the at least two joining parts, wherein c) the work surface forms the exterior surface of the basic body and extends around the entire circumference and comprises a first structure, the form of which is adapted to a shape of at least one of the at least two joining parts, and d) the basic body comprises at least one channel, with an end of the channel being arranged at the second axial end of the basic body of the sonotrode, and with another end of the channel being connectable with a negative pressure source, so that one of the at least two joining parts is retainable and/or positionable on the second axial end of the basic body; and a holding device having an anvil comprising a second basic body and at least one pressure segment, wherein in operation of the welding device, the at least two joining parts are pressable against the work surface of the sonotrode by means of the at least one pressure segment.

2. The welding device according to claim 1, wherein the second basic body of the anvil comprises a form which is adapted to a shape of at least one of the at least two joining parts.

3. The welding device according to claim 1, wherein the at least one pressure segment comprises a form which is at least partly adapted to a shape of one of the at least two joining parts.

4. The welding device according to claim 1, wherein the at least one pressure segment comprises a structure in the form of a plurality of elevations in a portion of a pressure surface.

5. The welding device according to claim 1, wherein the work surface comprises a second structure in the form of a plurality of elevations.

6. The welding device according to claim 1, wherein in cross section with respect to the longitudinal axis, the first structure of the sonotrode has one of the following shapes: circle, ellipse, oval, polygon, or a combination of them.

7. The welding device according to claim 1, wherein the second basic body of the anvil has a form that is complementary with regard to the second joining part so that the second basic body assumes a stabilizing and positioning function for the second joining part, and the at least one pressure segment is adapted to the shape of the second joining part.

8. The welding device according to claim 1, wherein the second basic body of the anvil comprises a plane surface.

9. A welding method for use with the welding device according to claim 1, the welding method comprising:

a) providing a first joining part and a second joining part which are at least partly made of weldable material, b) arranging the first joining part and the second joining part between the work surface of the sonotrode, the work surface being arranged laterally to the vibration direction of the sonotrode, and the at least one pressure segment, c) inducing the sonotrode to vibrate, causing joining energy to be laterally introduced into a joining zone and a welding connection to establish between the first joining part and the second joining part, and d) moving apart the work surface of the sonotrode and the at least one pressure segment so that the first joining part and second joining part which are welded together can be taken out from the welding device.

10. The welding method according to claim 9, wherein a vibration of the sonotrode takes place in the ultrasonic range.

11. The welding method according to claim 9, wherein providing the first joining part and the second joining part comprises:

a) providing the first joining part, b) arranging the first joining part adjacent to the second axial end of the sonotrode, c) retaining the first joining part that is arranged adjacent to the second axial end of the sonotrode by means of negative pressure, and d) positioning the sonotrode with the first joining part retained thereon at a required position.

12. The welding method according to claim 11, further comprising:

e) releasing the first joining part at the required position.

* * * * *